(No Model.)
J. LEADLEY.
CONDUCTOR HOOK.
No. 327,279. Patented Sept. 29, 1885.
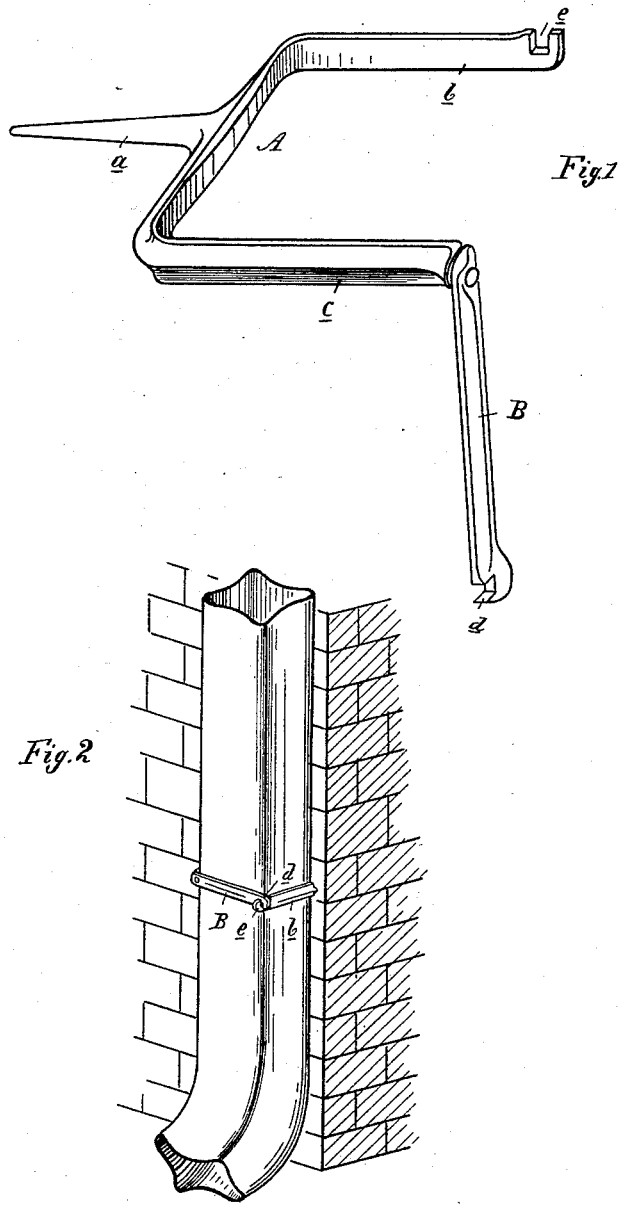
Attest
John Schuman.
H. J. Sprague
Inventor:
John Leadley.
by his Att'y
Thos. S. Sprague

UNITED STATES PATENT OFFICE.

JOHN LEADLEY, OF DETROIT, MICHIGAN.

CONDUCTOR-HOOK.

SPECIFICATION forming part of Letters Patent No. 327,279, dated September 29, 1885.

Application filed August 13, 1885. (No model.)

*To all whom it may concern:*

Be it known that I, JOHN LEADLEY, of Detroit, in the county of Wayne and State of Michigan, have invented new and useful Improvements in Conductor-Hooks; and I do hereby declare that the following is a full, clear, and exact description thereof, reference being had to the accompanying drawings, which form a part of this specification.

This invention relates to certain new and useful improvements in conductor-pipe hooks; and the invention consists in the peculiar construction of the hook, and means employed for securing the conductor-pipe after the hooks have been driven into the building in the line upon which the pipe is to run, all as more fully hereinafter set forth.

Figure 1 is a perspective view of my improved hook open. Fig. 2 is a perspective view, showing manner of securing conductor-pipe to a building.

In the accompanying drawings, which form a part of this specification, A represents my improved hook, which is preferably cast in malleable iron, and which is provided with the tang $a$, designed to be driven into the building. It is also provided with the two arms $b\ c$, to the latter of which is pivotally secured in any convenient manner one end of the gate B, the free end of which is provided with a hook, $d$, adapted when closed to engage with the hook $e$ in the outer end of the arm $b$.

In practice the line or direction in which the pipe is to run from the eaves having been determined, the hooks are driven into the wall upon the line so established, and at suitable distances apart, preferably leaving the gates open. The conductor-pipe, as an entire length or in sections, is placed within the hooks and the gates closed, as shown in Fig. 2, thus confining the pipe in its proper alignment, and without danger of marring or denting the pipe.

It will readily be seen that the pipe can be easily removed for the purpose of repairs by merely opening the gates, and without removing the hooks from the wall.

I am aware that a two-part ring, one part of which is provided with a tang, and the two hinged together, has been heretofore used for the same purpose, and such construction is not sought to be covered in this application.

I attach importance to the rectangular form of my hook, whereby it can be used for either rectangular or cylindrical pipes; also to the hinged gate, by which the pipe can be much more readily secured or released.

What I claim as my invention is—

As a new article of manufacture, a conductor-hook consisting of the part A, provided with the tang $a$, parallel arms $b\ c$, the former provided with hook $e$, and gate B, provided with hook $d$, all constructed, arranged, and operating substantially in the manner and for the purposes specified.

JOHN LEADLEY.

Witnesses:
H. S. SPRAGUE,
CHARLES J. HUNT.